No. 678,555.  
F. W. FÖRSTER.  
TIRE AND FELLY DRILL.  
(Application filed Feb. 28, 1901.)  
(No Model.)  
Patented July 16, 1901.
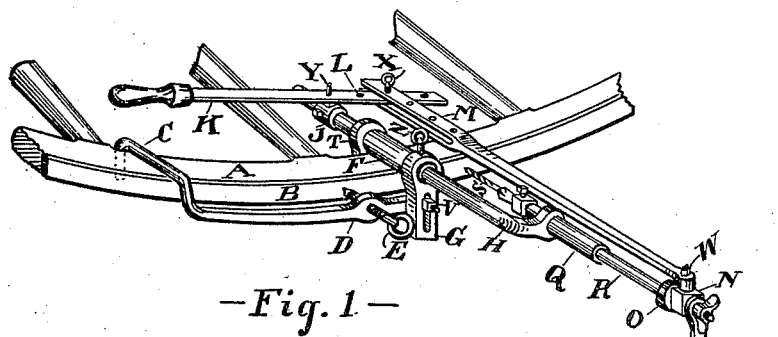
—Fig. 1—
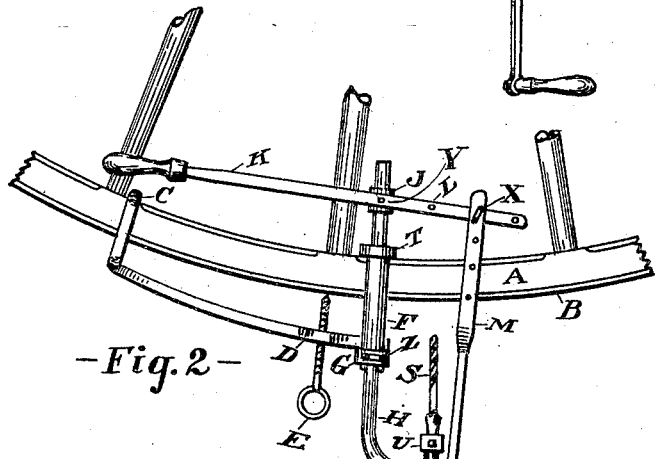
—Fig. 2—
—Fig. 3—
Witnesses—  
G. F. Downing  
S. G. Nottingham
Inventor—  
F. W. Förster  
by H. A. Seymour  
Atty.
THE NORRIS PETERS CO., PHOTO-LITHO., WASHINGTON, D. C.

UNITED STATES PATENT OFFICE.

FRIEDRICH WILHELM FÖRSTER, OF BURLINGTON, IOWA.

TIRE AND FELLY DRILL.

SPECIFICATION forming part of Letters Patent No. 678,555, dated July 16, 1901.

Application filed February 28, 1901. Serial No. 49,340. (No model.)

*To all whom it may concern:*

Be it known that I, FRIEDRICH WILHELM FÖRSTER, a resident of Burlington, in the county of Des Moines and State of Iowa, have invented certain new and useful Improvements in Tire and Felly Drills; and I do hereby declare the following to be a full, clear, and exact description of the invention, such as will enable others skilled in the art to which it appertains to make and use the same.

My invention relates to an improved tire and felly drill, the object of the invention being to provide a device of this character which can be quickly secured in position on a wheel to bore a hole or holes through the tire and felly thereof.

With this object in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a plan view, and Fig. 3 is a view of a modified form of lever K.

A represents a section of wheel, of ordinary construction, having the wooden felly and metal tire B and on which my improved drill is shown in the drawings in an operative position.

F represents a sleeve having secured at each end lugs G and T, respectively, parallel to each other and depending from the sleeve. The inner lug T is held against the inner face of the felly A by a screw E, which latter is screwed through a bar D, adjustably connected at one end to the lug G by a bolt V, disposed in a slot in the lug G and secured in place by a nut. The other end of the bar D is bent at right angles and made in the form of a hook C to engage the inner face of felly A, so that when the screw E is forced against the tire B it will draw the hook C and lug T tight against the wheel-felly and secure the sleeve F rigidly in position.

A rod H is mounted in the sleeve F and is secured at any adjustment therein by a thumb-screw Z, and said rod H is bent at right angles at its outer end and has secured therein a bearing-sleeve Q, in which a shaft R is revolubly mounted. The shaft R carries at its inner end a removable boring bit or tool S and at its outer end a crank P and is provided near its outer end with a ring O to limit the inward movement of the shaft R in sleeve Q and to provide a means of forcing the rod R through the sleeve Q when pressure is applied through the link M on the collar N and carries at or near its inner end a ring U to limit the outward movement of the shaft.

An angular collar N is mounted on the shaft R between the ring O and crank P and carries a pin W, on which one end of a link M is pivotally secured, the other end of said link M being bifurcated and the bifurcated members made with alined holes to receive a pin X. The pin X is adapted to be passed through any of the series of holes in link M and through any one of a series of holes L in one end of a lever K, located between the bifurcated members of the link M. The lever K is fulcrumed between its ends on a pin Y on a sleeve or collar J, adjustably secured on the inner end of rod H and is provided at its free end with a suitable handle or handhold, as shown.

Instead of providing the lever K with a series of holes I might make the same with an elongated slot and with a series of notches for the reception of the pin Y to permit of quick adjustment of the lever.

The drill S may have a shoulder, as shown, to ream out the hole made, and thus fit the hole for the immediate reception of the tire-bolt.

The operation of my improvements is as follows: The wheel A, with the tire B thereon, is placed in a horizontal position on any desired support. The hook C and lug T are inserted on the inner side of the felly and the nut V adjusted in the lug G to center the screw E on the tire B, when it is forced against the tire to tightly bind the hook C and lug T against the felly and hold the sleeve F and parts supported thereby in position, and by means of the screw Z the rod H can be adjusted to center the drill S on the tire. The operator then draws toward him with his left hand the free end of lever K, and thus, through the medium of link M, moves the shaft R inward and the boring-tool S against the tire, and by feeding the tool forward with his left hand and turning crank P with his right he quickly bores through the tire B and felly A.

The bifurcated end of link M can be adjusted on the lever K by moving the pin X from one hole to another therein and by moving the lever K (when it is in the form shown in Fig. 3) so as to move the pin from notch to notch therein.

Various slight changes might be resorted to in the general form and arrangement of the several parts described without departing from the spirit and scope of my invention, and hence I would have it understood that I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a tire and felly drill, the combination with a boring-tool holder, of a clamping-frame carrying said holder and constructed to be secured to and carried by said tire and felly, means carried by the frame for moving the tool-holder longitudinally and means also carried by said frame for revolving the tool-holder.

2. In a tire and felly drill, the combination with a boring-tool holder, of a frame carrying said tool-holder and provided with means for clamping the frame to the tire and felly and centering the boring-tool, and means carried by said frame for operating the tool-holder.

3. In a tire and felly drill, the combination with a boring-tool, of means for centering the same on a wheel-tire, a lever for moving the tool longitudinally and a crank for turning it.

4. In a tire and felly drill, the combination with a sleeve and means for rigidly holding the same on a wheel, of a rod adjustably secured in said sleeve, a boring-tool revolubly supported by the outer end of the rod, a lever fulcrumed between its ends at the inner end of said rod, and a link connecting one end of said lever and the boring-tool to move the latter forward and backward when the free end of the lever is moved.

5. In a tire and felly drill, the combination with a rod and means for rigidly securing the same on a wheel, of a bearing carried by the bent outer end of the rod, a shaft in said bearing, a boring-tool carried by the inner end of said shaft, a crank secured to the outer end of the shaft, a lever fulcrumed between its ends to the inner end of the rod, and a link adjustably connected at one end to one end of the lever and at its other end to the outer end of the shaft.

6. In a tire and felly drill, the combination with a rod and means for rigidly securing the same to and supporting it on the tire and felly of a wheel, of a bearing carried by the bent outer end of the rod, a shaft revolubly and longitudinally movable in said bearing, collars on said shaft to limit its movement, a boring-tool on the inner end of the shaft, a crank on its outer end and means for moving said shaft longitudinally in its bearing.

7. In a tire and felly drill, the combination with a sleeve and means for boring a hole supported thereby, of depending lugs at each end of said sleeve one of which to be disposed against the inner face of a wheel-felly, the other made with an elongated slot, a bar, a bolt adjustably securing one end of the same in said slot, the other end of said bar bent to form a hook to engage the inner face of a wheel-felly, and a set-screw in said bar to engage the wheel-tire and clamp the wheel between the inner lug on the sleeve, and the hook on the bar, on one side and the screw on the other.

In testimony whereof I have signed this specification in the presence of two subscribing witnesses.

FRIEDRICH WILHELM FÖRSTER.

Witnesses:
 JNO. J. SEERLEY,
 CHAS. C. CLARK.